(12) United States Patent
Matsumoto et al.

(10) Patent No.: US 8,023,727 B2
(45) Date of Patent: Sep. 20, 2011

(54) ENVIRONMENT MAP GENERATING APPARATUS, ENVIRONMENT MAP GENERATING METHOD, AND ENVIRONMENT MAP GENERATING PROGRAM

(75) Inventors: Kosei Matsumoto, Yokohama (JP); Toshio Moriya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 755 days.

(21) Appl. No.: 12/118,014

(22) Filed: May 9, 2008

(65) Prior Publication Data

US 2009/0226113 A1     Sep. 10, 2009

(30) Foreign Application Priority Data

Mar. 7, 2008 (JP) ................................. 2008-058105

(51) Int. Cl.
*G06K 9/00* (2006.01)
(52) U.S. Cl. ..................................... 382/154; 382/153
(58) Field of Classification Search .................. 382/153, 382/154; 345/418–426
See application file for complete search history.

(56) References Cited

U.S. PATENT DOCUMENTS

| 7,211,980 | B1 * | 5/2007 | Bruemmer et al. | ........... 318/587 |
| 7,539,563 | B2 * | 5/2009 | Yang et al. | ............ 701/24 |
| 2004/0049341 | A1 * | 3/2004 | Fujiwara | ............ 701/210 |
| 2004/0168148 | A1 * | 8/2004 | Goncalves et al. | ........... 717/104 |
| 2004/0229254 | A1 * | 11/2004 | Clair | ............ 435/6 |
| 2008/0009964 | A1 * | 1/2008 | Bruemmer et al. | ........... 700/245 |
| 2008/0009965 | A1 * | 1/2008 | Bruemmer et al. | ........... 700/245 |
| 2009/0316951 | A1 * | 12/2009 | Soderstrom | ........... 382/103 |

OTHER PUBLICATIONS

Tsubouchi, et al., "A SLAM Based Teleoperation and Interface System for Indoor Environment Reconnaissance in Rescue Activities", Sep. 28-Oct. 2, 2004, Sendai, Japan, pp. 1096-1102.

* cited by examiner

*Primary Examiner* — Jingge Wu
(74) *Attorney, Agent, or Firm* — Antonelli, Terry, Stout & Kraus, LLP.

(57) ABSTRACT

An environment map generating apparatus is provided. The environment map generating apparatus includes: a storage unit, a cross-sectional image generating unit, a model processing unit, an obtaining unit and an environment map generating unit. The storage unit stores a model of an obstacle. The cross-sectional image generating unit generates a cross-sectional image of a model of an obstacle at a predetermined height from a reference plane in an environment. The model processing unit generates a cross-sectional image-appended model by superimposing the cross-sectional image onto the model of the obstacle. The obtaining unit obtains an obstacle map at the predetermined height from the reference plane in the environment. The environment map generating unit generates an environment map where the cross-sectional image-appended model is superimposed in a semitransparent state onto the corresponding obstacle in the obstacle map.

11 Claims, 10 Drawing Sheets

FIG. 5
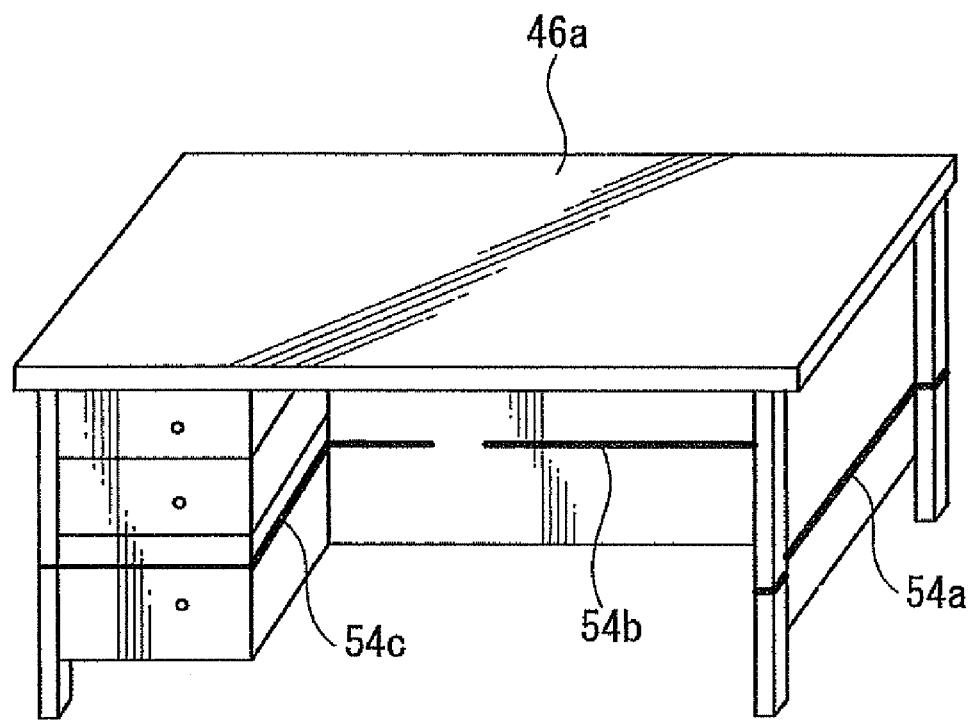
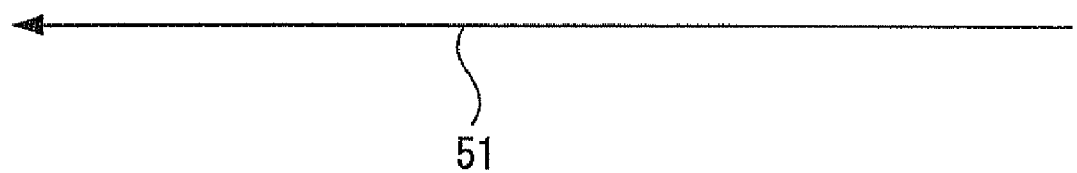

ENVIRONMENT MAP GENERATING APPARATUS, ENVIRONMENT MAP GENERATING METHOD, AND ENVIRONMENT MAP GENERATING PROGRAM

CROSS REFERENCES TO RELATED APPLICATIONS

The present invention contains subject matter related to Japanese Patent Application JP 2008-058105 filed in the Japanese Patent Office on Mar. 7, 2008, the entire contents of which being incorporated herein by reference.

BACKGROUND OF THE INVENTION

1. Field of the Invention

The present invention relates to an environment map generating apparatus, environment map generating method, and environment map generating program that generate an environment map showing the geometric form of an environment.

2. Description of the Related Art

To enable a robot to move automatically in a certain environment (such as an office or a factory), data showing the geometric form of the environment (for example, information showing how obstacles such as chairs and desks are laid out and showing the forms of such chairs and desks) is normally required. Such data showing the geometric form of an environment is called an "environment map". An apparatus for generating such environment map is called an "environment map generating apparatus". By reading an environment map into a robot, it becomes possible for the robot itself to prepare a route plan so that the robot will move while avoiding obstacles and the like. Accordingly, it is important to generate an environment map that corresponds to the actual environment.

As one example, T. Tsubouchi, A. Tanaka, A. Ishioka, M. Tomono, S. Yuta, "A SLAM Based Teleoperation and Interface System for Indoor Environment Reconnaissance in Rescue Activities", IEEE/RSJ International Conference on Intelligent Robots and Systems, Vol. 2, pp. 1096-1102, 2004 proposes a technology that lays out models of obstacles by superimposing the models at appropriate positions on a map (hereinafter simply "robot map") generated based on measurement data produced by a laser distance sensor that measures the external form of the environment, obstacles, and the like. The technology disclosed by the above-described Non-Patent Document generates images where models of obstacles present in a space are viewed from above (hereinafter, such images are called "overhead images of obstacles") and by having the user lay out such images so as to be superimposed on a robot map, an environment map is generated as coordinate data including two-dimensional information.

SUMMARY OF THE INVENTION

However, with the invention disclosed by the above-described Non-Patent Document, although the robot map shows the external form of the environment at the height of a scanning plane of the laser distance sensor, the overhead images of the obstacles laid out on the robot map may not include height information. Accordingly, it is not possible for the user to determine geometric characteristics that are common to the overhead images of the obstacles at the height of the operation plane and the robot map which can be used as a guide when laying out the overhead images of the obstacles on the robot map. Therefore, it may be difficult to specify the positional relationships that are required when laying out the overhead images of the obstacles on the robot map.

It is desirable to allow the positions at which models of obstacles are laid out on a robot map to be easily specified.

According to an embodiment of the present invention, there is provided an environment map generating apparatus. The environment map generating apparatus includes: a storage unit that stores a model of an obstacle; a cross-sectional image generating unit that generates a cross-sectional image of the model of the obstacle at a predetermined height from a reference plane in an environment; a model processing unit that generates a cross-sectional image-appended model by superimposing the cross-sectional image onto the model of the obstacle; an obtaining unit that obtains an obstacle map at the predetermined height from the reference plane in the environment; and an environment map generating unit that generates an environment map where the cross-sectional image-appended model is superimposed in a semitransparent state onto the corresponding obstacle in the obstacle map.

Note that the expression "model" for the present invention refers to computer graphics that can be expressed by coordinate data including two-dimensional information or three-dimensional information.

According to the configuration described above, a cross-sectional image of a model of an obstacle is generated at a predetermined height from a reference plane in an environment, and by displaying such cross-sectional image in a semi-transparent state on the model, it is possible for the user to compare the geometric characteristics of the model of the obstacle and the robot map. By doing so, it is possible to support an operation where the user lays out models of obstacles on the robot map so that the respective geometric characteristics match.

According to an embodiment of the present invention, it is possible to easily specify positions at which models of obstacles should be laid out on a robot map and to generate an environment map that expresses the accurate geometric form of an actual environment.

BRIEF DESCRIPTION OF THE DRAWINGS

FIG. 5 is a diagram used for explaining the measurement of the form of a desk using a sensor mounted on a robot.

DESCRIPTION OF THE PREFERRED EMBODIMENTS

Figure 1:
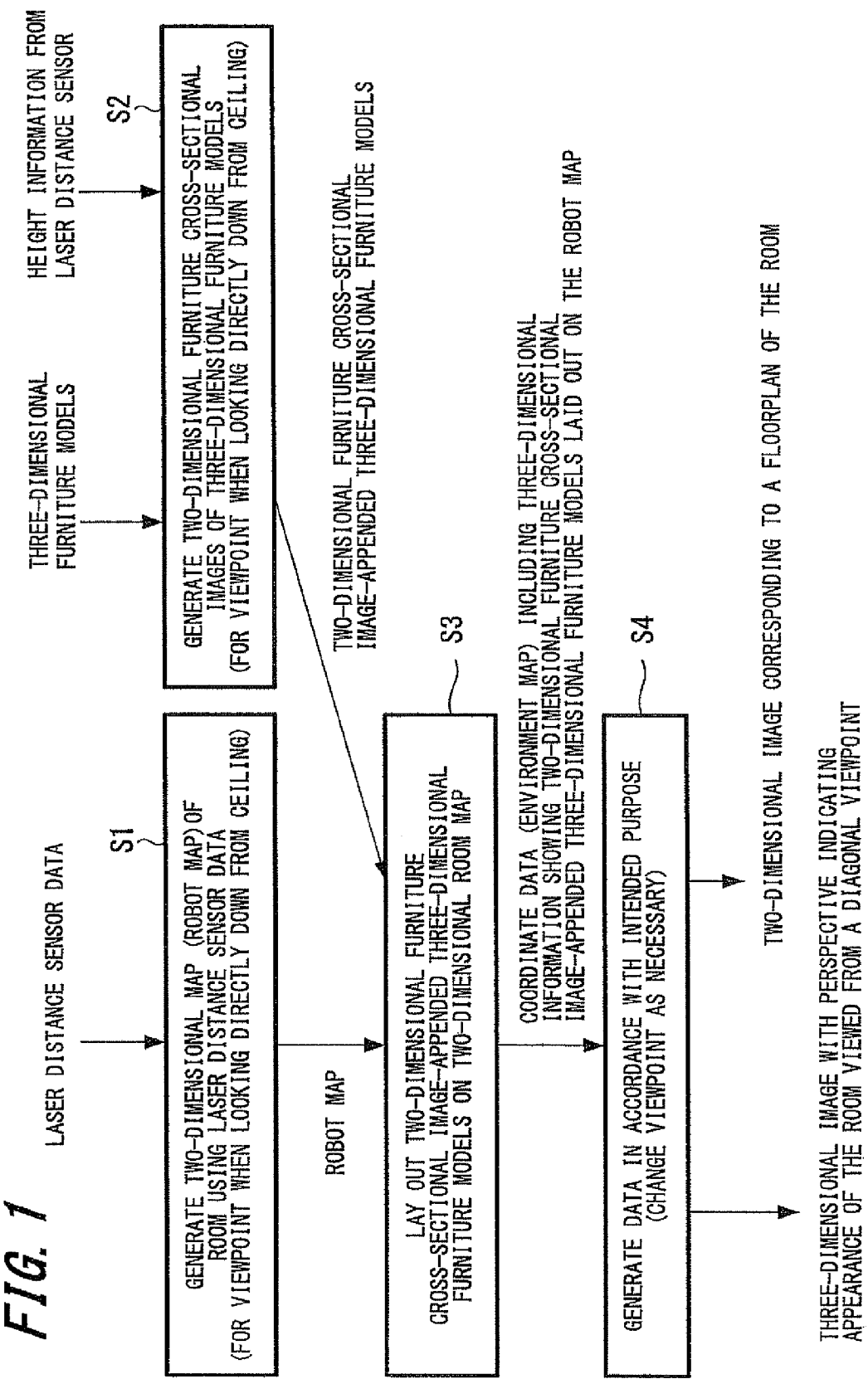
FIG. 1 is a schematic diagram showing an environment map generating process of an environment map generating apparatus according to an embodiment of the present invention.

The embodiments of the present invention described below are preferred examples of the present invention, and for that reason are subject to various limitations that are preferable for technical reasons. However, the present invention is not limited to such embodiments. Also, the dimensions, form, layout relationships, and the like in the drawings that accompany the description schematically show mere examples of such embodiments.

Embodiments of the present invention will now be described with reference to the attached drawings.

First, before describing the configuration of an environment map generating apparatus according to an embodiment of the present invention, an overview of the environment map generating process according to the present invention will be described with reference to the flowchart shown in FIG. 1. The case described here is where the form of a room to be measured and obstacles such as furniture inside the room are measured using a laser distance sensor, and a suitable image for the intended purpose is generated from data obtained by measurement and models of the obstacles such as furniture.

First, based on data ("laser distance sensor data") showing the form of a room and obstacles inside the room that have been measured by a laser distance sensor, a robot map showing the form of the room on a scanning plane at a predetermined height of a laser distance sensor and the form of the obstacles inside the room is generated (step S1). Note that the robot map is generated for a viewpoint where the room is viewed directly downward from the ceiling of the room.

On the other hand, based on furniture models (three-dimensional furniture models) showing the three-dimensional form of the furniture, cross-sectional images (two-dimensional furniture cross-sectional images) at the height of the scanning plane of the laser distance sensor are generated (step S2). Note that the cross-sectional images are generated for the viewpoint where the room is viewed directly downward from the ceiling of the room. Next, cross-sectional image-appended furniture models where the three-dimensional furniture models and the two-dimensional cross-sectional images are associated are generated.

In the robot map generated by the processing in step S1, the cross-sectional image-appended furniture models are laid out at positions that match the geometric characteristics of the cross-sectional images generated by the process in step S2 (step S3). One example of the data generated by the processing in step S3 is given below.

(1) An environment map that is coordinate data including three-dimensional information and shows how the three-dimensional furniture models appended with the two-dimensional cross-sectional images have been laid out in the robot map.

Since the environment map is coordinate data including three-dimensional information as described above, if a virtual camera for projecting such map onto a two-dimensional plane is provided in a three-dimensional data space and the projection results of such camera can be calculated, it is possible to obtain an image that can be checked by the user. When calculating such an image, by changing the viewpoint expressed by the position and posture of the camera, it is possible to generate a suitable image for the intended purpose (step S4).

Examples of the image generated by the process in step S4 are given below.

(2) A three-dimensional image with the same sense of depth as when the viewer is actually in the room which is produced by setting the camera so that the viewpoint has the same height and direction as the viewer's eyes.

(3) A two-dimensional image corresponding to a floorplan of the room produced by setting the camera so that the viewpoint is the equivalent of looking downward at the floor from the ceiling.

Figure 2:
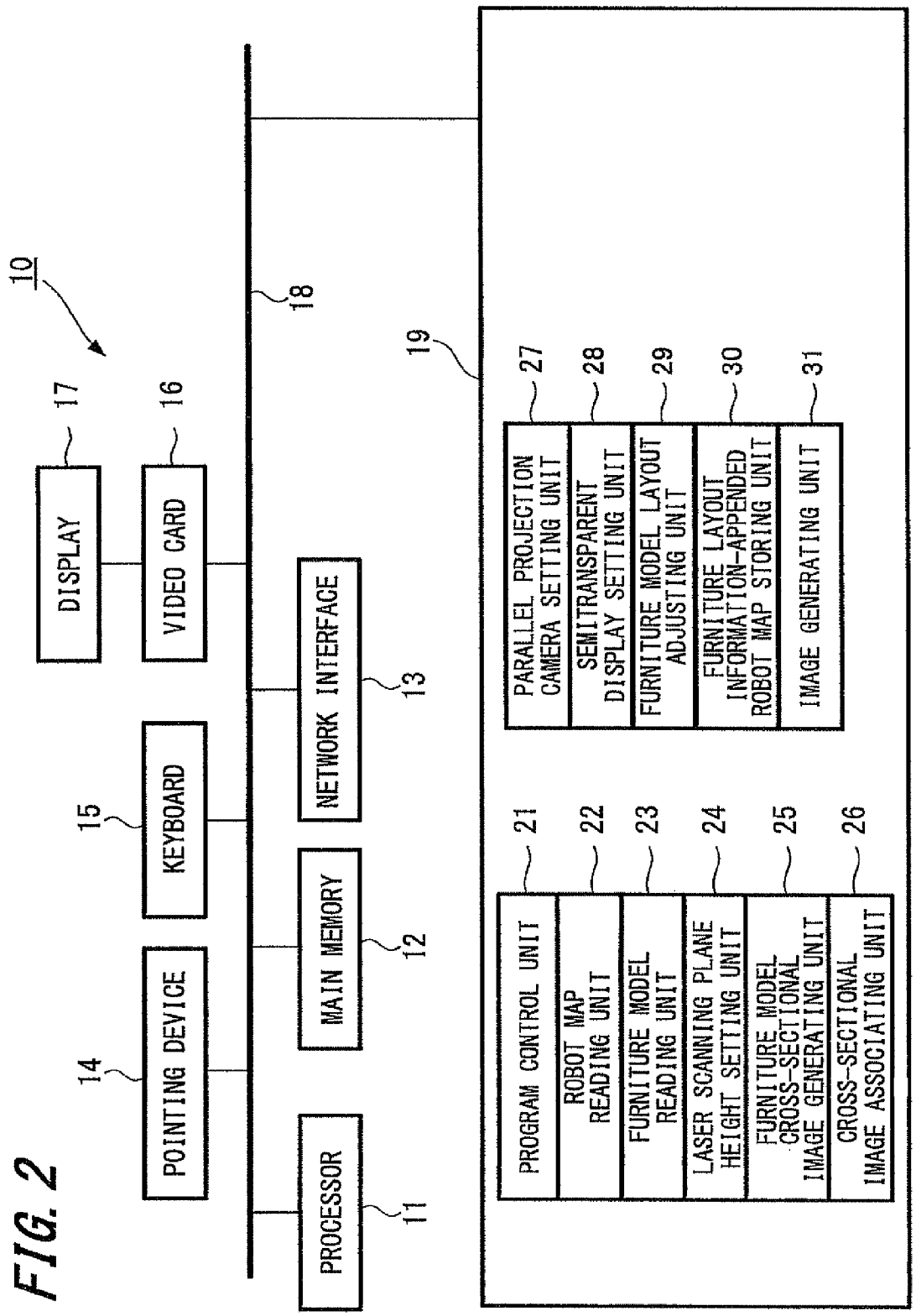
FIG. 2 is a block diagram showing one example of the configuration of an environment map generating apparatus according to an embodiment of the present invention.

Next, one example of the internal configuration of an environment map generating apparatus according to an embodiment of the present invention will be described with reference to the block diagram shown in FIG. 2. The environment map generating apparatus 10 shown in FIG. 2 is an example where a map generating apparatus according to the present invention is applied to a computer. The environment map generating apparatus 10 includes a processor 11, a main memory 12, a network interface 13, a pointing device 14, a keyboard 15, a video card 16, a display 17, and a storage apparatus 19. These blocks are connected to one another via a communication line 18 so as to exchange data with one another. The communication line 18 may be a wired or wireless connection so long as the respective component elements described above are connected to one another.

The processor 11 is one example of a control unit and carries out control of the respective blocks inside the environment map generating apparatus 10 based on a program stored in the storage apparatus 19. The main memory 12 is a memory for temporarily storing data that is transmitted and received between the various blocks via the communication line 18.

The network interface 13 is one example of a communication unit, connects the environment map generating apparatus 10 to a network, and carries out communication with an external communication device. Note that certain parts of the respective blocks inside the environment map generating apparatus 10 may be constructed so as to be physically remote and connected via this kind of network.

The pointing device 14 and the keyboard 15 are examples of operation units and generate and output operation input signals for causing the processor 11 to carry out processing desired by the user in accordance with user operations.

The display 17 is one example of a display unit and displays images generated according to a predetermined program stored in the storage apparatus 19 via the video card 16.

The storage apparatus 19 forms a principal part of the present invention and includes the following component elements: a program control unit 21; a robot map reading unit 22; a furniture model reading unit 23; a laser scanning plane height setting unit 24; a furniture model cross-sectional image generating unit 25; a cross-sectional image associating unit 26; a parallel projection camera setting unit 27; a semi-transparent display setting unit 28; a furniture model layout adjusting unit 29; a furniture layout information-appended robot map storing unit 30; and an image generating unit 31. The functions with which these component elements are equipped are realized by a series of programs (hereinafter collectively referred to as the "environment map generating program").

The program control unit 21 controls processing carried out in each block included in the storage apparatus 19.

The robot map reading unit 22 reads a robot map file that was generated by scanning a plane scanned at a predetermined height from a reference plane in the environment. In the followings, this robot map file is referred to as the "robot map". The robot map is one example of an obstacle map, and may be stored in advance in the storage apparatus 19 or on a removable medium or the like, not shown, or may be stored externally so that the robot map can be obtained via the network interface 13. The robot map is described in detail later in this specification.

The furniture model reading unit 23 reads a file in which the three-dimensional geometric forms of furniture have been recorded as models (hereinafter referred to as "furniture models"). These furniture models may be stored in advance in the storage apparatus 19 or on a removable medium or the like, not shown, or may be stored externally so that the furniture models can be obtained via the network interface 13. The furniture models are also described in detail later in this specification.

The laser scanning plane height setting unit 24 obtains information showing the height of the scanning plane of the measured environment at which the robot map was generated from the robot map read by the robot map reading unit 22 and sets such information as the height information used when the cross-sectional images of furniture models are generated. This height information may be stored in advance in a memory provided in a mobile robot or sensor for measuring data for generating the robot map and obtained by communication via a network. Alternatively, a dialogue for inputting height information may be displayed in an operation screen displayed on the display 17 and the height information may be set by a user input using the pointing device 14, such as a mouse, or the keyboard 15.

The furniture model cross-sectional image generating unit 25 generates cross-sectional images of the furniture models read by the furniture model reading unit 23 based on the height information set by the laser scanning plane height setting unit 24. Here, a plane at the height set by the laser scanning plane height setting unit 24 is calculated and cross-sectional images with line segments where the furniture models with three-dimensional information are intersected by such plane are generated. The furniture model cross-sectional image generating unit 25 is one example of a "cross-sectional image generating unit" mentioned in the patent claims.

The cross-sectional image associating unit 26 constantly displays the cross-sectional images of the furniture models generated by the furniture model cross-sectional image generating unit 25 superimposed on the corresponding furniture models. The cross-sectional image associating unit 26 is one example of the "model processing unit" mentioned in the patent claims.

The parallel projection camera setting unit 27 sets the projection method used when a three-dimensional space in which the cross-sectional images, furniture models, and robot map are laid out is projected onto a two-dimensional plane by a virtual camera and displayed as an image to the user as a "parallel projection" that has no perspective. The parallel projection camera setting unit 27 also sets the viewpoint of a user camera so that the position and posture thereof is opposite the robot map, or in other words, so that the floor is viewed from above looking down from the ceiling. Accordingly, when three-dimensional furniture models are laid out on a two-dimensional robot map, it is possible to see the respective image characteristics of images and models with different depths in the three-dimensional space superimposed on a display screen. Accordingly, the user can lay out the furniture models while checking the relative positional relationships between the geometric characteristics of the cross-sectional images and the geometric characteristics of the robot map on the display screen.

When the cross-sectional image-appended furniture models are displayed on the robot map, the semitransparent display setting unit 28 sets the transparency of the cross-sectional images and furniture models so that the robot map can be seen through the images and models. By doing so, it becomes possible for the user to check the relationships between the relative positions and postures of the geometric characteristics of the respective images. The transparency of the cross-sectional images and furniture models may be set so that the robot map can be seen through the images and models as the background. For example, a transparency that is decided in advance may be set or a transparency in keeping with the brightness, hue, and the like of the robot map, the cross-sectional images, and the furniture models may be set. Alternatively, the transparency may be set based on a user operation of the pointing device 14, the keyboard 15, or the like.

The furniture model layout adjusting unit 29 sets the layout such as the position and posture of the cross-sectional image-appended furniture models on the robot map. This setting of the layout is carried out based on the image characteristics of the robot map and the cross-sectional image-appended furniture models. The setting may also be carried out based on a user operation of the pointing device 14, the keyboard 15, or the like.

The furniture layout information-appended robot map storing unit 30 stores the environment map generated by the furniture model layout adjusting unit 29 in a predetermined region of the storage apparatus 19. Hereinafter, the "furniture layout information-appended robot map storing unit 30" is referred to as the "environment map storing unit 30" to be simplified.

The image generating unit 31 displays images that reflect the processes carried out in the respective blocks of the storage apparatus 19 on the display 17.

Figure 3:
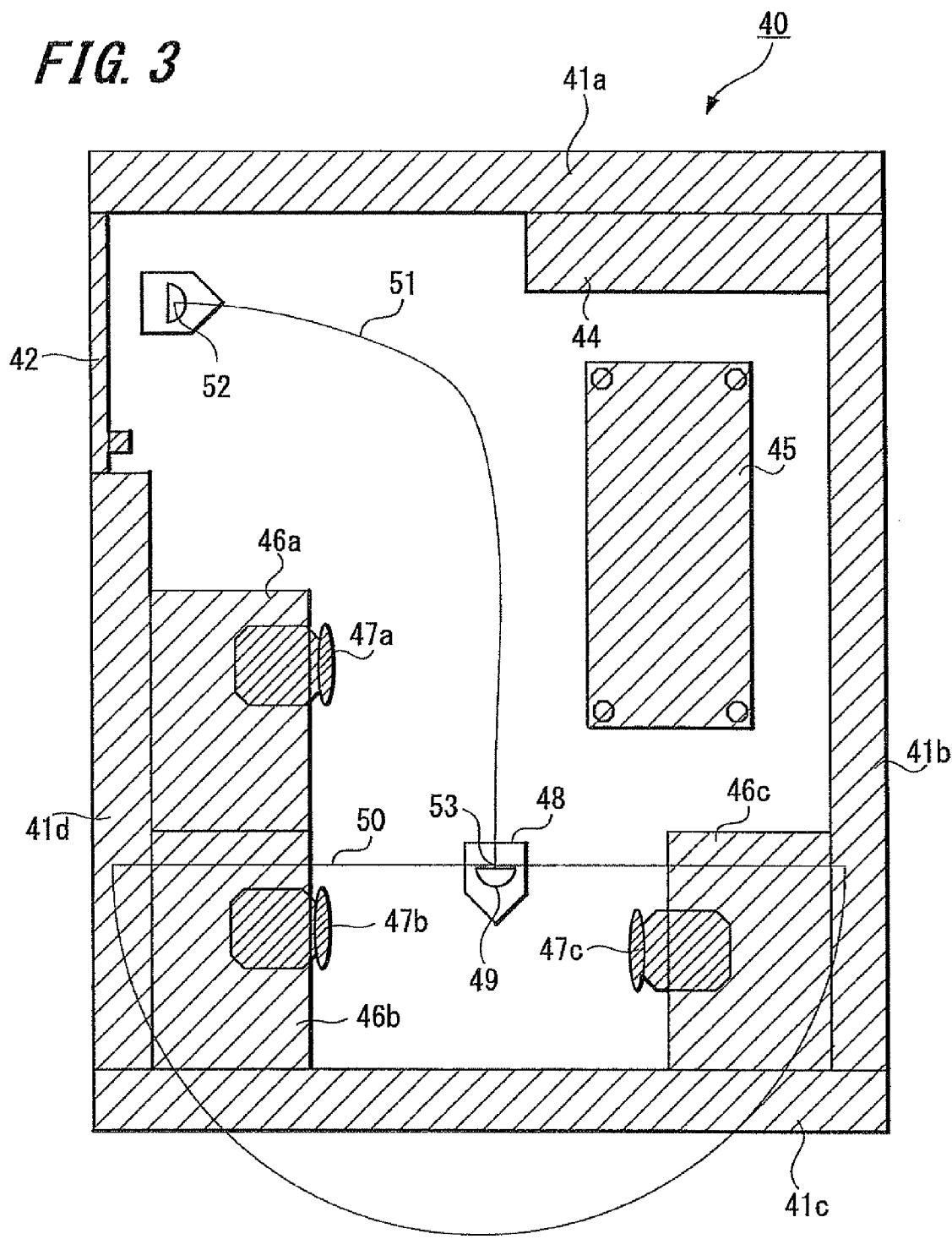
FIG. 3 is a diagram showing a room to be measured using a sensor mounted on a robot.
Figure 4:
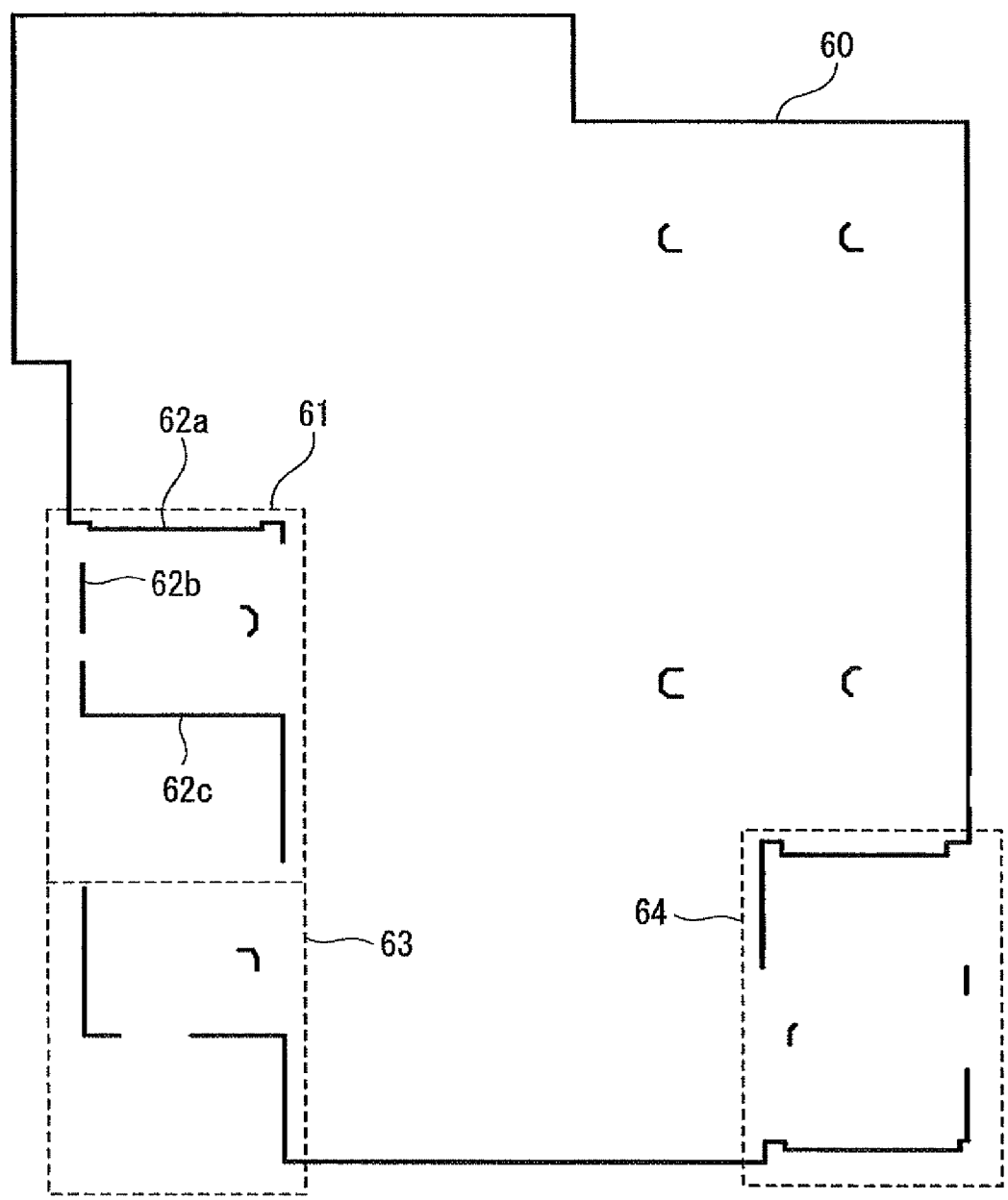
FIG. 4 is a diagram showing one example of a robot map.

Next, the robot map mentioned above will be described with reference to FIG. 3 and FIG. 4. FIG. 3 shows one example of an environment (room) measured by a sensor mounted on a robot. FIG. 4 shows a map formed by measuring the geometric form of the environment using the sensor mounted on the robot. The geometric forms shown in this map are for the case where measurement is carried out at the robot's eye level, or in other words, at a predetermined height from a given reference plane.

The obliquely shaded parts in FIG. 3 show obstacles present inside a room 40 that is the environment measured, and in FIG. 3, the obstacles include walls 41*a*, 41*b*, 41*c*, and 41*d*, a door 42, shelves 44, a table 45, desks 46*a*, 46*b*, and 46*c*, and chairs 47*a*, 47*b*, and 47*c*.

A mobile robot 48 which is capable of moving and is equipped with a laser distance sensor 49 that measures the geometric forms of obstacles by measuring the distance from the obstacles using a laser is placed inside this room 40.

The laser distance sensor 49 mounted on the mobile robot 48 is fixed so as to have a scanning plane that is parallel to the reference plane of the room 40 (the scanning plane is normally horizontal). The laser scanning plane 50 shows a range where a laser emitted from the laser distance sensor 49 scans horizontally and measures the geometric forms of obstacles. The laser distance sensor 49 measures the geometric form of the room 40 on the laser scanning plane 50.

The mobile robot 48 equipped with this type of laser distance sensor 49 measures the geometric form of the surrounding environment while moving on a movement path 51 in the room 40 from a start point 52 to an end point 53. A robot map 60 (see FIG. 4) showing the geometric forms of obstacles inside the room 40 is then obtained from the measurement results of the laser distance sensor 49. A known technique is used as the method of obtaining the robot map from the measurement results of the laser distance sensor 49. A typical example is a method based on an ICP (Iterative Closest Point) algorithm that defines distances for groups of points included in a plurality of measurement data obtained by moving on the movement path 51 and finds relative positions and postures for measurement data by convergence calculations so that the distances are minimized.

However, since the laser distance sensor 49 measures the geometric forms of the obstacles using a laser, such locations as the laser is not directly incident (such as in the shadow of obstacles) may not be measured. This will now be described focusing on a frame 61 part that is shown by the broken line in the robot map 60. The frame 61 corresponds to a position where the desk 46a and the chair 47a are located inside the room 40. As shown in FIG. 5, the desk 46a is provided with drawers on the left side thereof, and has side panels attached to the front, left, and right sides.

In the robot map 60 shown in FIG. 4, many lines are broken, such as the thick lines 62a, 62b, and 62c, which shows that the geometric forms of the desk 46a and the chair 47a are not completely reproduced. This happens because when the laser distance sensor 49 is measuring in the periphery of the desk 46a and the chair 47a while the mobile robot 48 is moving on the movement path 51, positions where the laser is not incident (i.e., shadows) are produced by the side panel of the desk 46a and the leg of the chair 47a. That is, the thick lines 54a, 54b, and 54c in FIG. 5 show the positions on the desk 46a where the laser from the laser distance sensor 49 is incident. These positions where the laser is incident that are shown by the thick lines 54a, 54b, and 54c respectively correspond to the thick lines 62a, 62b, and 62c in the robot map 60.

Note that although a laser distance sensor is used in the present embodiment to form the robot map, provided that it is possible to measure the positions (geometric forms) of obstacles observed on a plane that is parallel to and at a predetermined height from the reference plane, the sensor is not limited to a laser distance sensor. It is also possible to use various types of sensors, with examples of such being an infrared sensor, an ultrasonic sensor, and a camera.

In addition, the scanning range (i.e., viewing angle) of the sensor may be optionally selected, and by attaching a plurality of sensors with a narrow scanning range (i.e., a small viewing angle) onto the mobile robot, it is possible to use a sensor system with an increased scanning range.

Next, the furniture models laid out on the robot map will be described with reference to FIG. 3 and FIG. 6. Here, the expression "furniture models" refers to three-dimensional CG (computer graphics) models that show the geometric forms of furniture (such as chairs, desks, walls, and doors) present inside the room 40 shown in FIG. 3. More specifically, the furniture models are produced by expressing the furniture present inside the room 40 using coordinate data including predetermined three-dimensional information. The furniture models are one example of the "models of obstacles" mentioned in the patent claims.

Figure 6:
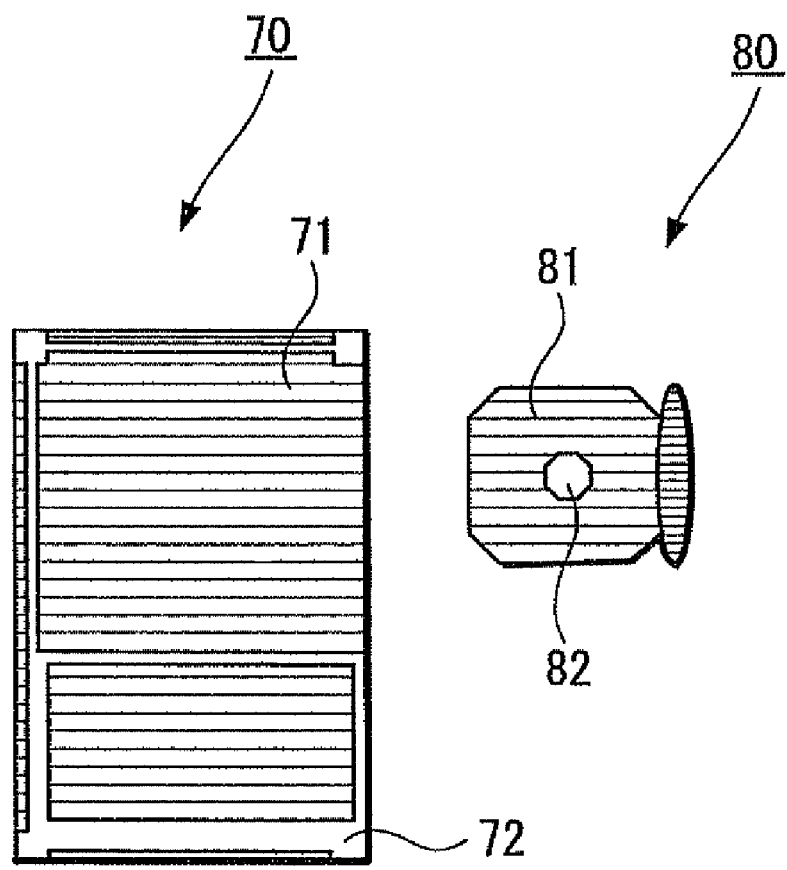
FIG. 6 is a diagram showing examples of CG models that show the geometric forms of furniture and cross-sectional images thereof.

FIG. 6 shows examples of CG models showing the geometric forms of furniture and cross-sectional images thereof. Two-dimensional geometric forms are respectively displayed for the case where the furniture model 71 of the desk and the furniture model 81 of the chair are viewed from a predetermined direction. In this example, the geometric forms looking-from-above viewpoint are displayed. The cross-sectional images 72 and 82 are cross-sectional images of the furniture model 71 of the desk and the furniture model 81 of the chair at the height of the laser scanning plane 50 of the laser distance sensor 49 mounted on the mobile robot 48. The cross-sectional image 72 of the furniture model 71 of the desk and the cross-sectional image 82 of the furniture model 81 of the chair are superimposed while the respective models are distinguishable from each other. Next, three-dimensional images when looking from the predetermined direction are set as a cross-sectional image-appended furniture model 70 of the desk and a cross-sectional image-appended furniture model 80 of the chair. Similar furniture models are also prepared for the wall 41, the door 42, the desk 44, and the table 45. Note that cross-sectional images are not displayed for obstacles that are not present on the scanning plane which is at a predetermined height from the reference plane.

Figure 7:
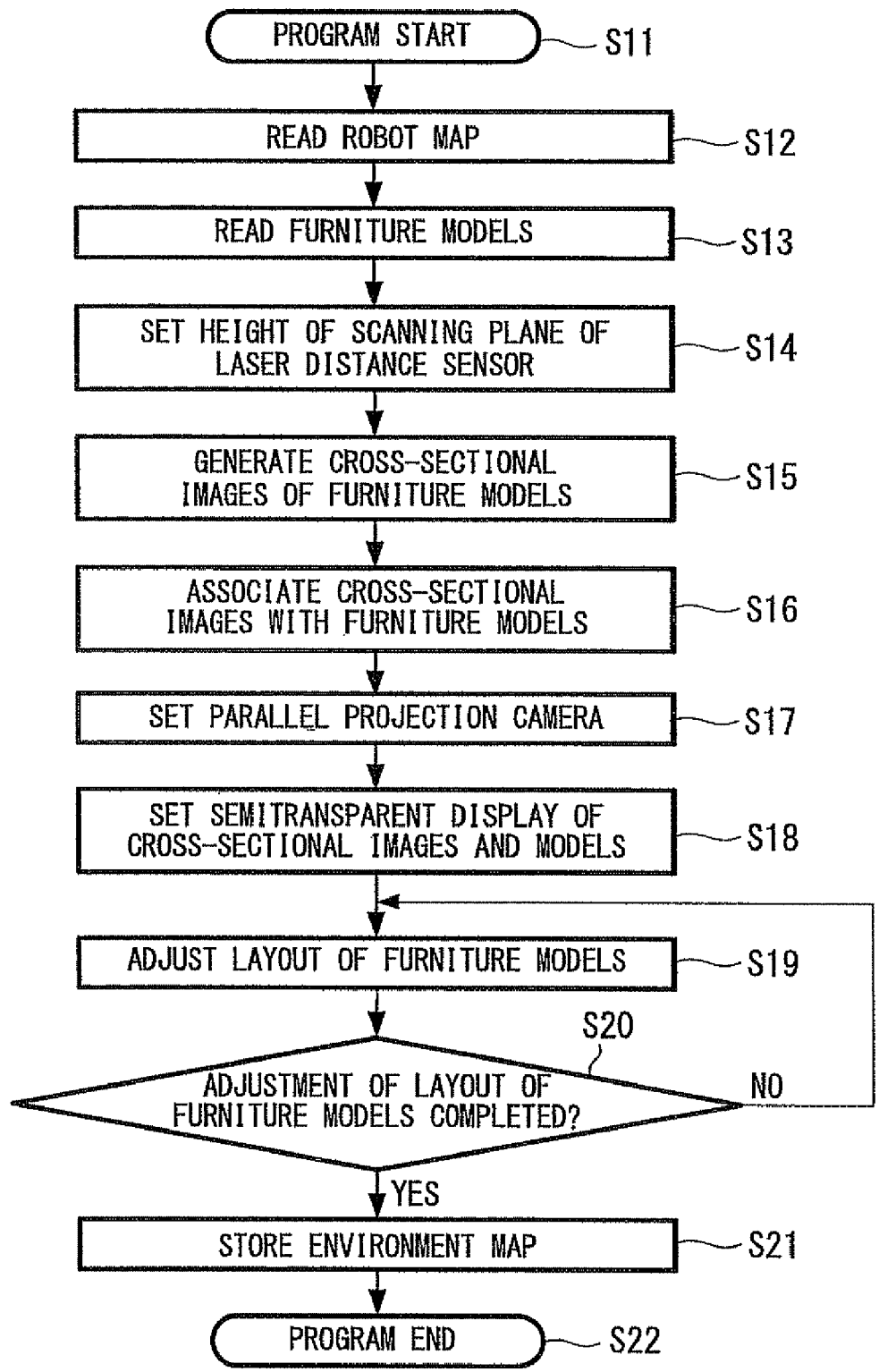
FIG. 7 is a flowchart used for explaining the operation of the environment map generating apparatus according to an embodiment of the present invention.

Next, the operation of the environment map generating apparatus that is an embodiment of the present invention will be described. FIG. 7 is a flowchart used for explaining the operation of an environment map generating apparatus according to an embodiment of the present invention. One example of an environment map generating process carried out by the processor 11 of the environment map generating apparatus 10, that is, the processing in step S1 to step S3 in FIG. 1, will now be described in detail with reference to FIG. 7. This environment map generating process is one example of the case where an environment map of the room 40 is generated by laying out cross-sectional image-appended furniture models on the robot map 60 based on user operation of the pointing device 14 and the keyboard 15. Note that although not shown in the flowchart, the processing results of the processes in the respective steps are displayed on a screen.

First, in response to a user operation or the like, the processor 11 transfers an environment map generating program stored in the storage apparatus 19 to the main memory 12 to make the environment map generating program executable.

Next, the processor 11 accesses the program control unit 21 of the environment map generating program transferred to the main memory 12 and starts the environment map generating process (step S11).

First, as preparation, the program control unit 21 causes the robot map reading unit 22 to read the robot map 60 (step S12). Subsequently, the robot map 60 read by the robot map reading unit 22 is outputted to the laser scanning plane height setting unit 24 and the furniture model layout adjusting unit 29. At the same time, the program control unit 21 outputs the robot map 60 to the image generating unit 31. The processor 11 displays the robot map 60 that has been converted to an image by the image generating unit 31 on the display 17.

On the other hand, the program control unit 21 causes the furniture model reading unit 23 to read the furniture models of the desks, chairs, and the like that are to be laid out on the robot map (step S13). The furniture models are outputted to the furniture model cross-sectional image generating unit 25 and the cross-sectional image associating unit 26.

Also, height information on the laser scanning plane 50 of the laser distance sensor 49 used when generating the robot map 60 is obtained from the robot map 60 outputted from the robot map reading unit 22 to the laser scanning plane height setting unit 24 (step S14). The program control unit 21 then outputs the height information on the laser scanning plane 50 to the furniture model cross-sectional image generating unit 25.

At this point, processing that generates the cross-sectional images of the furniture models outputted from the furniture model reading unit 23 to the furniture model cross-sectional image generating unit 25 is carried out based on the height information on the laser scanning plane 50 outputted from the laser scanning plane height setting unit 24 (step S15). The program control unit 21 outputs the generated cross-sectional images to the cross-sectional image associating unit 26. As one example, the cross-sectional images 72 and 82 are generated for the furniture models 71 and 81 of the desk and the chair (see FIG. 6).

Next, the cross-sectional image associating unit 26 associates the cross-sectional image 72 generated by the furniture model cross-sectional image generating unit 25 with the furniture model 71 of the desk read by the robot map reading unit 22 (step S16). More specifically, a process is carried out to superimpose the cross-sectional image 72 and the furniture model 71 of the desk while both are distinguishable. Subsequently, the program control unit 21 outputs the cross-sectional image 72 and the furniture model 71 of the desk that have been associated to the parallel projection camera setting unit 27.

At this point, a process (parallel projection) that converts the cross-sectional image 72 and the furniture model 71 of the desk that have been associated and outputted from the cross-sectional image associating unit 26 to the parallel projection camera setting unit 27 so as to appear as a two-dimensional image with no perspective (in reality, a three-dimensional image) is carried out to generate the cross-sectional image-appended furniture model 70 of the desk (step S17). Subsequently, the program control unit 21 outputs the cross-sectional image-appended furniture model 70 of the desk to the semitransparent display setting unit 28.

At this point, the transparency of the cross-sectional image-appended furniture model 70 of the desk outputted from the parallel projection camera setting unit 27 to the semitransparent display setting unit 28 is set to generate a cross-sectional image-appended furniture model 70 of the desk that has been made semitransparent (step S18).

Next, the program control unit 21 outputs the cross-sectional image-appended furniture model 70 of the desk that has been made semitransparent to the image generating unit 31. Subsequently, the processor 11 converts the model to an image using the image generating unit 31 and displays the cross-sectional image-appended furniture model 70 of the desk that has been made semitransparent, on the robot map 60 already displayed on the display 17.

Figure 8:
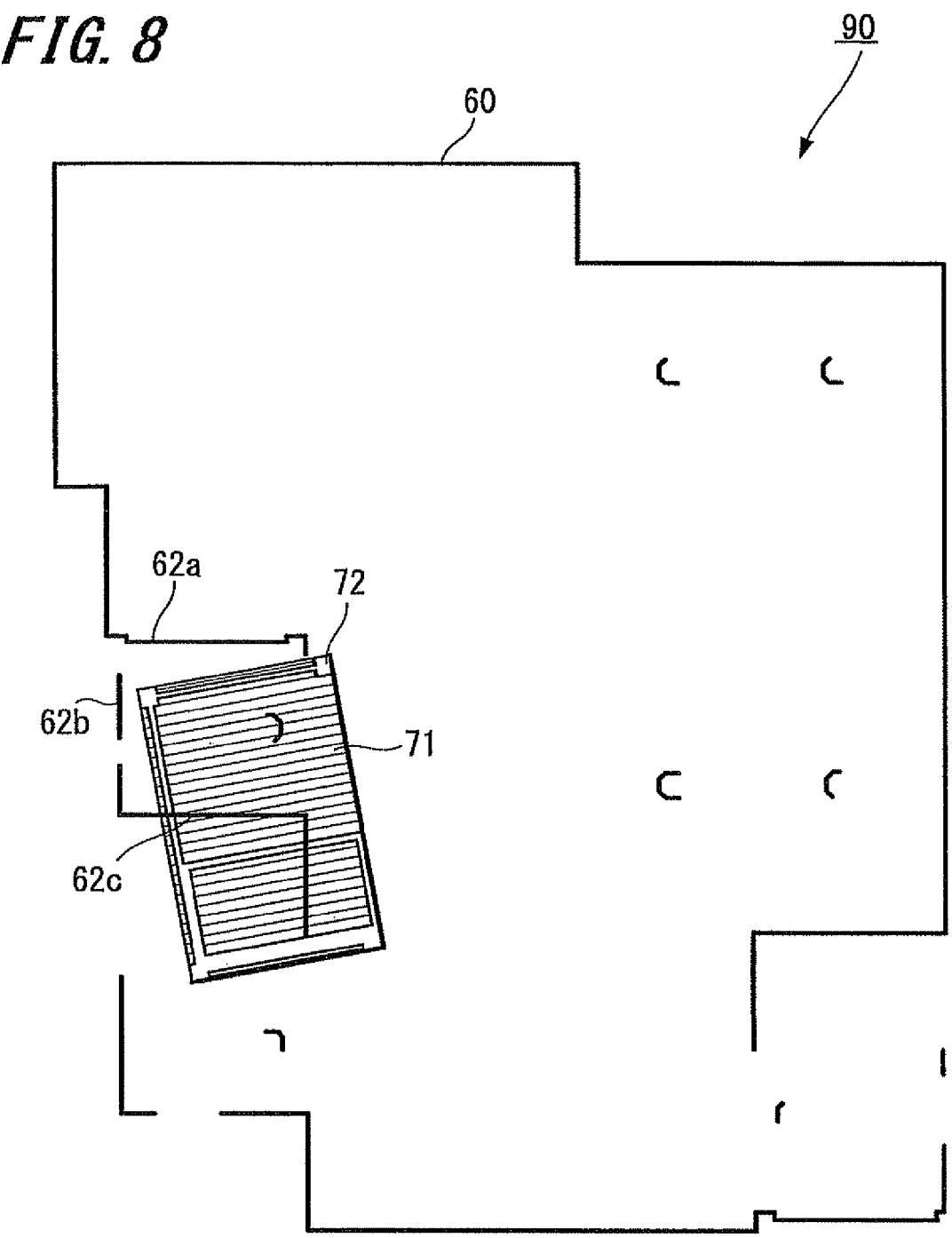
FIG. 8 is a diagram showing one example layout of a cross-sectional image-appended furniture model that has been made transparent.

Next, a display screen 90 before the completion of processing such as that shown in FIG. 8 is displayed on the display 17. In this display screen 90, the user lays out the cross-sectional image-appended furniture model 70 of the desk that has been made semitransparent and is displayed on the robot map 60. When doing so, based on a user operation, the furniture model layout adjusting unit 29 adjusts the position and posture of the cross-sectional image-appended furniture model 70 of the desk that has been made semitransparent and lays out the desk in one of the frames 61, 63, and 64 that are suitable positions in the robot map 60 (step S19). Here, the expression "suitable positions" refers to positions in the robot map 60 that have common geometric characteristics with the cross-sectional image 72, for example, positions where segments of the thick lines 62a, 62b, and 62c of the frame 61 of the robot map 60 match the form of the cross-sectional image 72.

The adjustment of the position and posture of the cross-sectional image-appended furniture model described above is carried out using the pointing device 14, such as a mouse or by setting numeric values in a dialog on an operation screen to change the position and posture of the furniture model while visually confirming the position and posture.

At this point, it is determined whether another cross-sectional image-appended furniture model that has been made semitransparent is to be laid out on the robot map 60 (step S20). When another furniture model is newly laid out, the processing returns to the process in step S19 and the cross-sectional image-appended furniture model that has already been made semitransparent is laid out on the robot map 60 in accordance with a user operation.

Figure 9:
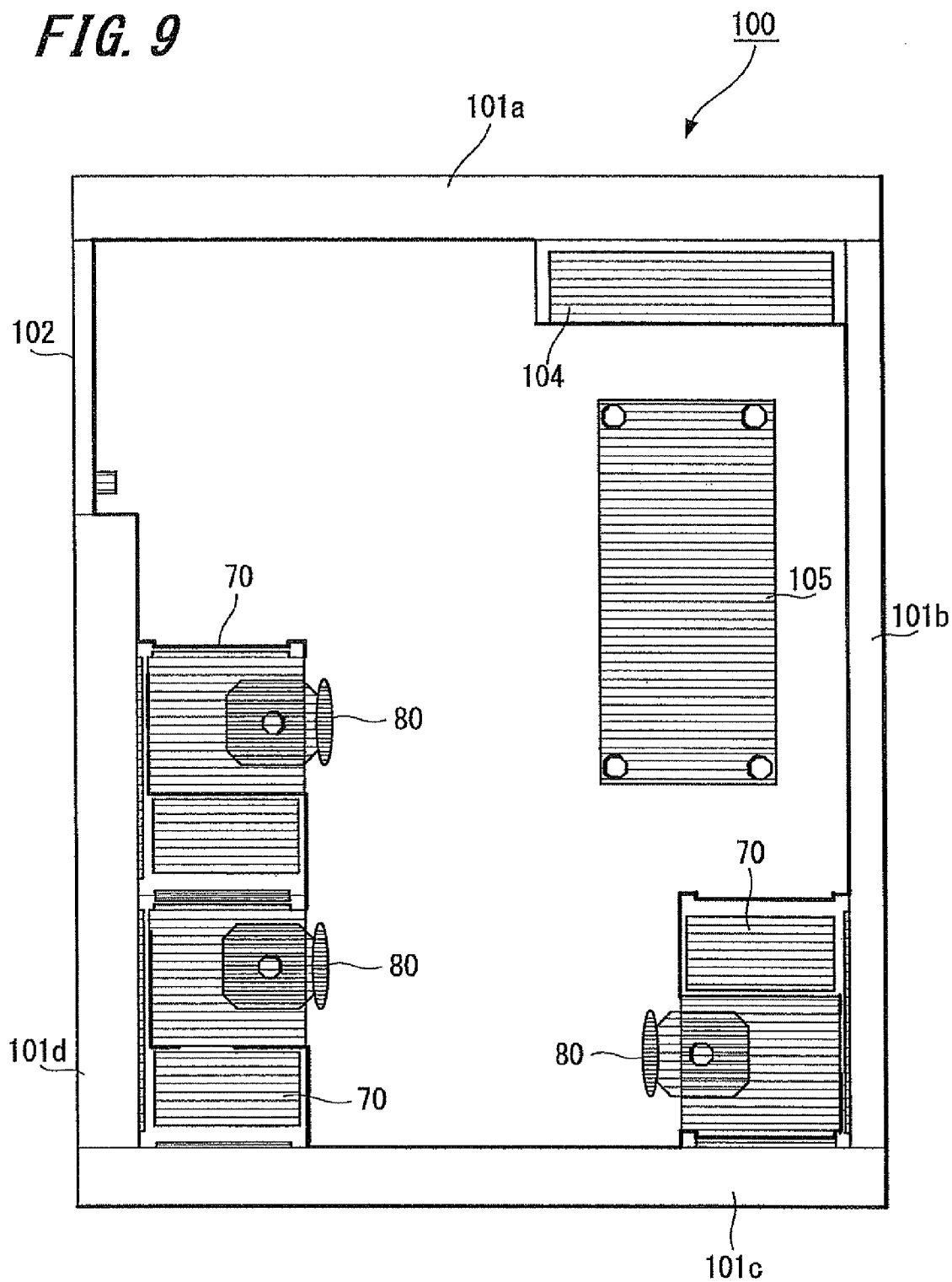
FIG. 9 is a diagram showing one example of an environment map generated by an environment map generating apparatus according to an embodiment of the present invention.

On the other hand, when there are no new models to be laid out, that is, when the laying out of all of the furniture models that have been made semitransparent on the robot map 60 has been completed, the generation of the environment map 100 shown in FIG. 9 is completed.

In the environment map 100, the cross-sectional image-appended furniture models 101a, 101b, 101c, and 101d of the walls are laid out at the respective positions of the walls, 41a, 41b, 41c, and 41d shown in FIG. 3 and the cross-sectional image-appended furniture model 102 of the door is laid out at the position of the door 42. In addition, the cross-sectional image-appended furniture model 104 of the shelves is laid out at the position of the shelves 44 shown in FIG. 3 and the cross-sectional image-appended furniture model 105 of the table is laid out at the position of the table 45. In addition, the cross-sectional image-appended furniture model 70 of the desk and the cross-sectional image-appended furniture model 80 of the chair are laid out at the respective positions of the desks 46a, 46b, and 46c and the chairs 47a, 47b, and 47c shown in FIG. 3. Note that in the example shown in FIG. 9, since the image for the looking-from-above viewpoint and the cross-sectional images are the same for the walls and the door, such items are represented using white.

Next, the program control unit 21 outputs the environment map 100 formed of three-dimensional data of the furniture models and the layout thereof from the furniture model layout adjusting unit 29 to the environment map storing unit 30.

As described above, the environment map 100 outputted from the furniture model layout adjusting unit 29 to the environment map storing unit 30 is stored in a predetermined region of the storage apparatus 19 (step S21) and the program control unit 21 thereby completes the execution of the environment map generating program (step S22).

With the process from the start and before the storing of the environment map 100 in step S21, scenes (environment maps) where the furniture models are laid out corresponding to the measurement results (the robot map 60) produced by the laser distance sensor 49 are formed. By rendering (i.e., drawing) such scenes for the viewpoint with the position and posture set by the processing in step S17, for example, an environment map can be generated as a CG image that enables the user to check how the furniture is laid out in the room and such map can be stored as an environment map file in the storage apparatus 19.

Note that since the viewpoint in the present embodiment is set opposite the robot map 60, an image is obtained where the entire scene is viewed looking down from above. When the user desires to obtain a three-dimensional image, that is, furniture layout CG, from a different viewpoint, an image for that viewpoint can be separately obtained by setting the position and posture of such viewpoint and carrying out rendering for the viewpoint.

In the embodiment of the present invention described above, since the cross-sectional image-appended furniture models are displayed having been semitransparently superimposed on the robot map generated based on the measurement results produced by the laser distance sensor 49, it is possible to easily compare the geometric characteristics of the robot map and the cross-sectional image-appended furniture models. Accordingly, it is possible to lay out the cross-sectional image-appended furniture models at more suitable positions on the robot map.

As a result, it is possible to generate the environment map 100 that shows the accurate geometric form (the geometric form of a room that includes obstacles) of an actual environment, such as the room 40. That is, it is possible to generate an environment map where the layout of obstacles in the actual environment is accurately reproduced. By generating a scene that accurately reproduces the layout of obstacles in a space inside an environment map, it is possible to accurately simulate a process to be carried out by a robot in the actual environment within the space in the environment map.

This kind of environment map is particularly effective when having a robot carry out repeated operations in an environment where the positions at which obstacles such as desks are located rarely change. For example, it becomes possible to smoothly apply robots to mail deliveries or cleaning in an office or the like or to transporting materials in a factory or the like.

Figure 10:
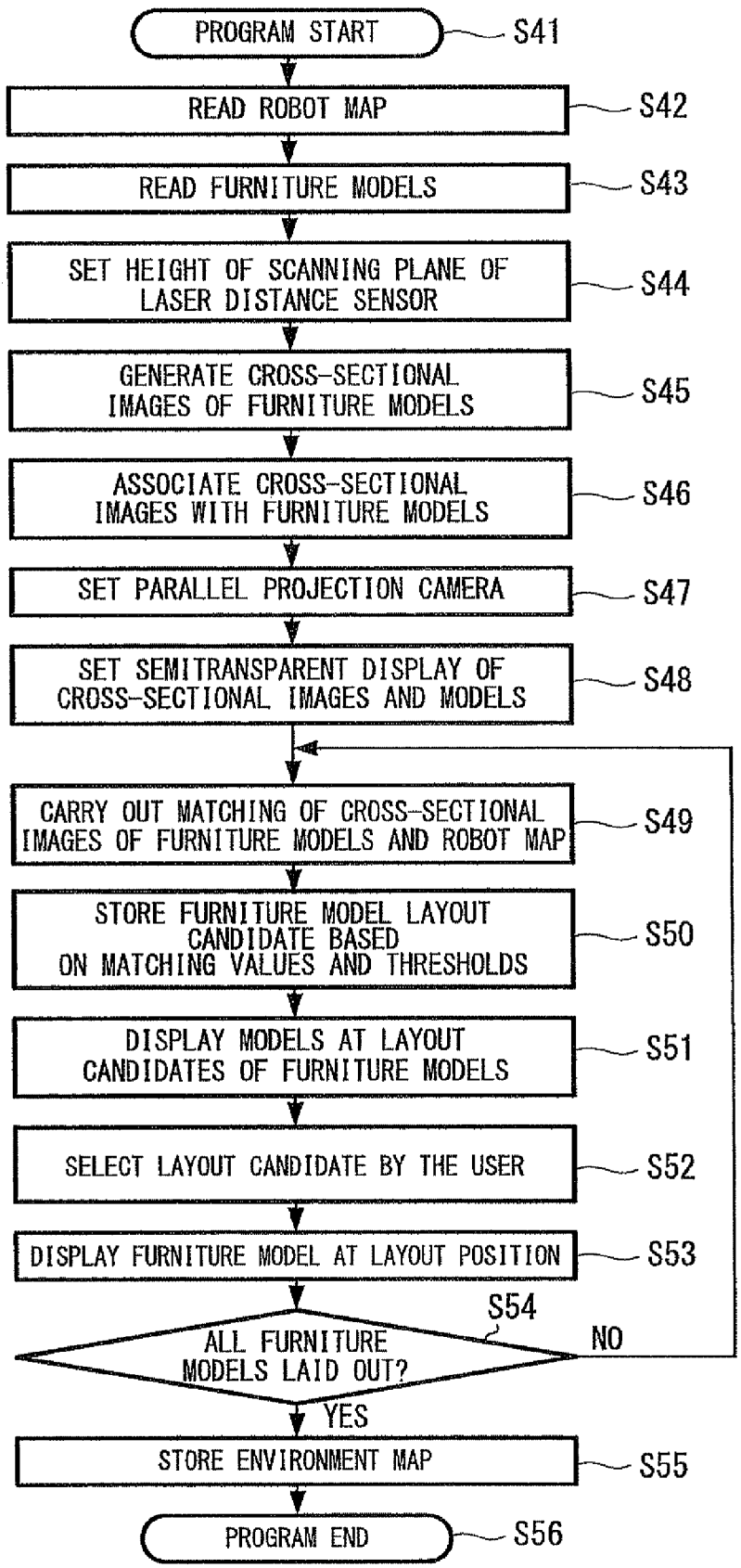
FIG. 10 is a flowchart used for explaining the operation of an environment map generating apparatus according to another embodiment of the present invention.

Next, the operation of an environment map generating apparatus according to another embodiment of the present invention will be described. FIG. 10 is a flowchart used for explaining the operation of an environment map generating apparatus according to another embodiment of the present invention. One example of an environment map generating process by the processor 11 of the environment map generating apparatus 10 will now be described with reference to FIG. 10. This environment map generating process is an example where the layout positions of the cross-sectional image-appended furniture models that have been made transparent on the robot map are automatically decided to generate the environment map 100 of the room 40.

In the flowchart shown in FIG. 10, the processing carried out by the furniture model layout adjusting unit 29 (see FIG. 3) of the environment map generating program, that is, the processes in step S19 and step S20 shown in FIG. 7 are replaced with the processes in step S49 to step S55. Since the other processes in step S41 to step S48 and step S55 to step S56 are the same as the processes in step S1 to step S8 and in step S21 to step S22 of the flowchart shown in FIG. 7, description thereof is omitted. The processing carried out by the furniture model layout adjusting unit 29 will now be described for the case where the processes in step S41 to step S47 have already been completed and the cross-sectional image-appended furniture model 70 of the desk that has been made transparent by the processing in step S48 has been outputted to the furniture model layout adjusting unit 29.

At this point, a display screen such as that shown in FIG. 8 is displayed on the display 17. In this display screen 90, the user operates the pointing device 14, the keyboard 15, or the like to select the cross-sectional image-appended furniture model 70 of the desk that has been made semitransparent and is displayed on the robot map 60. After the cross-sectional image-appended furniture model 70 of the desk has been selected, a "furniture layout candidate search button", not shown, is displayed on the display screen 90. By pressing the "furniture layout candidate search button" displayed on the display screen 90 using the pointing device 14 or the keyboard 15, the user causes the furniture model layout adjusting unit 29 to start matching the cross-sectional image 72 of the cross-sectional image-appended furniture model 70 of the desk that has been made transparent with the robot map 60 (step S49).

Here, the expression "matching" refers to superimposing the cross-sectional image 72 at various positions and postures on the robot map 60 and calculating the degree of similarity (this degree of similarity is referred to as the "matching value") in the geometric characteristics of the images and determining that there is a matching point for the cross-sectional image 72 on the robot map 60 when the matching value is above a threshold.

When it has been determined that a location where the geometric characteristics of the cross-sectional image 72 on the robot map 60 match is present in the matching results, the position and posture of the cross-sectional image 72 at that time are stored in a predetermined region of the storage apparatus 19 as a layout candidate (step S50).

Note that as the matching method, an existing algorithm such as SSD (Sum of Squared Differences) that finds the squares of the differences between pixels in two images and evaluates the degree of pattern similarity or the aforementioned ICP may be used, for example. Also, for the layout candidates of the cross-sectional images stored in the storage apparatus 19, in addition to storing the position and posture when the matching value is exceeded, it is also possible to store the position and posture for high-order positions with high values out of a plurality of matching values.

Next, the degrees of similarity between the robot map and the cross-sectional images and the positions and postures of the obstacles corresponding to such are fetched from the storage apparatus 19. Subsequently, positions and postures corresponding to degrees of similarity that exceed a threshold ("first threshold") where the degree of similarity is set in advance are determined as layout candidate positions of the cross-sectional image-appended furniture model 70 of the desk that has been made transparent. Subsequently, the cross-sectional image-appended furniture model 70 of the desk that has been made transparent is displayed at the layout candidate position on the robot map 60 (step S51). When there are a plurality of layout candidate positions, the cross-sectional image-appended furniture model 70 of the desk that has been made semitransparent is displayed at all of the layout candidate positions.

Subsequently, when the user selects his or her desired layout candidate position out of all the layout candidate positions using the pointing device 14 or the keyboard 15 for example, the position and posture of the cross-sectional image-appended furniture model 70 that has been made semitransparent and is displayed at the selected layout candidate position is stored in the main memory 12 (step S52).

Subsequently, in this case, the cross-sectional image-appended furniture model 70 of the desk that has been made semitransparent is displayed at the layout candidate position based on the position and posture stored in the main memory 12 by the processing in step S52. When doing so, the cross-sectional image-appended furniture models 70 of the desk that have been made semitransparent and displayed at positions aside from the layout candidate position selected by the processing in step S52 are deleted (step S53).

At this point, it is determined whether there is another cross-sectional image-appended furniture model that has been made semitransparent which is to be laid out on the robot map 60 (step S54). When newly laying out another furniture model, the processing returns to the process in step S49. Subsequently, the pointing device 14, the keyboard 15, or the like is used to lay out the cross-sectional image-appended furniture model that has been made semitransparent and corresponds to the furniture model selected by the user on the robot map 60. In this example, desks are laid out at three positions, and since only one of such positions has been designated, it is necessary to lay out the remaining two desks. Accordingly, the processing returns to step S49 and the series of processes is continued. Note that when the user wishes to lay out furniture models aside from the desk, such as a furniture model of a chair, the user selects the furniture model of the chair in the process in step S49.

Subsequently, the processing in step S49 to step S52 described above is repeated for the number and types of furniture models to be laid out, thereby generating the environment map 100 shown in FIG. 9.

Thus, the environment map 100 is stored in a predetermined region in the storage apparatus 19 (step S55) and the program control unit 21 thereby completes the environment map generating program (step S56).

Note that in the process of step S50, based on the position and the posture of the obstacles and the like corresponding to the highest degree of similarity stored in a predetermined region of the storage apparatus 19, one location candidate position for the cross-sectional image-appended furniture model 70 of the desk that has been made transparent may be selected and the cross-sectional image-appended furniture model 70 of the desk that has been made transparent may be laid out at such location candidate position. In this case, the user may not need to select a location candidate of a cross-sectional image-appended furniture model from a plurality of candidates and the processing in steps S51, S52 can be omitted.

Also, after the process in step S51 is complete, the cross-sectional image-appended furniture model that has been made semitransparent may be displayed at a layout candidate position that is a position and posture of the cross-sectional image-appended furniture model for a case where the degree of similarity of the geometric characteristics of the cross-sectional image-appended furniture model 70 of the desk with respect to the robot map 60 exceeds a second threshold that is higher than the first threshold.

In the other embodiment of the present invention described above, the layout candidate position of the cross-sectional image-appended furniture model that has been made semitransparent is displayed on the robot map based on the matching results for the cross-sectional images of the furniture models and the robot map. Accordingly, since the position at which the cross-sectional image-appended furniture model that has been made semitransparent should be laid out is automatically specified by a computer, the user may not need to select a layout candidate position.

Also, although layout candidates for a cross-sectional image-appended furniture model are presented using matching results and the user is allowed to select one out of such candidates in the other embodiment described above, it is also possible to automatically lay out the cross-sectional image-appended furniture model on the robot map based on the matching results (based on the sizes of the matching values, for example).

Also, although layout candidates for a cross-sectional image-appended furniture model that has been made semi-transparent are automatically specified and displayed by a computer in the other embodiment of the present invention, the user may check the position and posture of the cross-sectional image-appended furniture model whose layout position has been automatically decided and then finally decide the layout position. In addition, it should be obvious that this other embodiment of the present invention can achieve the same effect as the embodiment of the present invention described earlier.

Note that as described earlier (see FIG. 1), by changing the viewpoint and the like, it is possible to sort three-dimensional images that were generated by the process shown in FIG. 7 or in FIG. 10 and show how the three-dimensional furniture models that have been appended with two-dimensional cross-sectional images have been laid out on the robot map into the three types of images (1) to (3). One example of how these three types of images are used is described below.

First, the environment maps sorted into type (1) can be used as coordinate data when a robot operates in the environment, for example. That is, such environment maps are used as maps for informing the robot of its own position in the environment.

Also, by using furniture layout information which shows where the furniture models have been placed, it is possible to use a robot for applications such as placing objects on a desk.

Next, the three-dimensional images sorted into type (2) can be used when someone wishes to observe the environment as an image from any viewpoint. By doing so, it is possible for someone to check the environment after the furniture models that have been generated are laid out in the CG space.

In addition, the two-dimensional images sorted into type (3) can show how someone has laid out furniture in the robot map and can therefore be used as an image of a floorplan for instructing a robot of its destination or the like.

The present invention is not limited to the embodiments described above and it should be obvious that a variety of modifications and changes are possible without departing from the scope of the invention defined in the patent claims.

For example, although the functions of the environment map generating program are realized by software in the embodiments described above, the functions of the environment map generating program may be realized by hardware such as LSI (Large Scale Integration). Also, the functions of the environment map generating program may be realized by a combination of software and hardware.

It is also possible to appropriately set whether the cross-sectional images of the cross-sectional image-appended furniture models of the environment map 100 are displayed or not displayed (i.e., whether such images are displayed semitransparently). For example, when the environment map for a scanning plane at a predetermined height is mainly used by human users rather than by a robot, cross-sectional images may not be displayed (i.e., no semitransparent display).

Also, in accordance with the intended use of the environment map 100, an environment map that displays only cross-sectional images of the cross-sectional image-appended furniture models in the environment map 100 may be displayed.

Also, although the generated environment map is displayed as an image on a display or the like in the embodiments described above, by allowing a robot to directly read the environment map that is coordinate data including three-dimensional information or the like, the movement of the robot may be controlled based on the coordinate data.

Also, although an example where the environment map generating apparatus according to an embodiment of the present invention is applied to a standard computer has been described, the present invention is not limited to such example, and as another example the functions of the environment map generating apparatus shown in FIG. 1 may be provided in a robot that measures the geometric form of an environment. In this case, the environment map generating apparatus 10 only needs to be provided with a completed environment map from the robot, which reduces the processing load.

In addition, although a wheeled robot is given as an example of a moving object that is equipped with a sensor and measures the geometric form of an environment in the embodiments described above, a variety of devices aside from a robot, such as a car or a vehicle, can also be used. In such case, the environment is not limited to a room, and the environment for the moving object equipped with a sensor may be an outside area of a certain size, a port, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An environment map generating apparatus comprising:
a storage unit that stores a model of an obstacle;
a cross-sectional image generating unit that generates a cross-sectional image of the model of the obstacle at a predetermined height from a reference plane in an environment;
a model processing unit that generates a cross-sectional image-appended model by superimposing the cross-sectional image onto the model of the obstacle;
an obtaining unit that obtains an obstacle map at the predetermined height from the reference plane in the environment; and
an environment map generating unit that generates an environment map where the cross-sectional image-appended model is superimposed in a semitransparent state onto the corresponding obstacle in the obstacle map.

2. An environment map generating apparatus according to claim 1, wherein
the model processing unit generates the cross-sectional image-appended model by superimposing the cross-sectional image onto the model of the obstacle that corresponds to when the obstacle is observed from above in the environment.

3. An environment map generating apparatus according to claim 2, wherein
the model of the obstacle is a three-dimensional image.

4. An environment map generating apparatus according to claim 3, wherein
the environment map generating unit displays layout candidates for the cross-sectional image-appended model on the obstacle map based on a degree of similarity for geometric characteristics of the cross-sectional image-appended model with respect to the obstacle map.

5. An environment map generating apparatus according to claim 4, wherein
the environment map generating unit is operable when the degree of similarity of the geometric characteristics of the cross-sectional image-appended model with respect to the obstacle map exceeds a set first threshold, to display a layout candidate of the cross-sectional image-appended model on the obstacle map.

6. An environment map generating apparatus according to claim 5, wherein
the environment map generating unit decides a layout position out of layout candidates of the cross-sectional image-appended model displayed on the obstacle map based on a selection instruction made via a user operation.

7. An environment map generating apparatus according to claim 5, wherein
the environment map generating unit selects a cross-sectional image-appended model where the degree of similarity of the geometric characteristics of the cross-sectional image-appended model with respect to the obstacle map is the highest, and displays the selected cross-sectional image-appended model on the obstacle map.

8. An environment map generating apparatus according to claim 5, wherein
the environment map generating unit selects a cross-sectional image-appended model where the degree of similarity of the geometric characteristics of the cross-sectional image-appended model with respect to the obstacle map exceeds a second threshold that is larger than the first threshold and displays the selected cross-sectional image-appended model on the obstacle map.

9. An environment map generating apparatus according to claim 3, wherein
the environment map generating unit lays out a cross-sectional image-appended model on the obstacle map based on an instruction made via a user operation.

10. An environment map generating method comprising:
generating a cross-sectional image of a model of an obstacle at a predetermined height from a reference plane in an environment;
generating a cross-sectional image-appended model by superimposing the cross-sectional image onto the model of the obstacle;
obtaining an obstacle map at the predetermined height from the reference plane in the environment; and
generating an environment map where the cross-sectional image-appended model is superimposed in a semitransparent state onto the corresponding obstacle in the obstacle map.

11. An environment map generating program for causing a computer to execute the steps of:
generating a cross-sectional image of a model of an obstacle at a predetermined height from a reference plane in an environment;
generating a cross-sectional image-appended model by superimposing the cross-sectional image onto the model of the obstacle;
obtaining an obstacle map at the predetermined height from the reference plane in the environment; and
generating an environment map where the cross-sectional image-appended model is superimposed in a semitransparent state onto the corresponding obstacle in the obstacle map.

* * * * *